United States Patent [19]

Kanamori

[11] 4,349,591
[45] Sep. 14, 1982

[54] YIELDABLE TYPE ORNAMENT ASSEMBLY

[75] Inventor: Hiroshi Kanamori, Yokohama, Japan

[73] Assignee: Nissan Motor Co., Ltd., Yokohama, Japan

[21] Appl. No.: 146,871

[22] Filed: May 5, 1980

[30] Foreign Application Priority Data

May 9, 1979 [JP] Japan .................................. 54-56614

[51] Int. Cl.³ .............................................. B60R 13/00
[52] U.S. Cl. ...................................... 428/31; 40/591;
280/727; 411/429; D12/197
[58] Field of Search ......................... 428/31; 280/727;
248/475 B, 478; 40/591; D12/197-201; 52/110;
411/374, 429

[56] References Cited

U.S. PATENT DOCUMENTS

| 2,624,976 | 1/1953 | Ferrera | 428/31 X |
| 2,757,954 | 8/1956 | Hurley | 428/31 X |
| 3,813,113 | 5/1974 | Burnham | 428/31 X |
| 3,929,310 | 12/1975 | Peham | 428/31 X |
| 3,968,977 | 7/1976 | Wilfert | 428/31 X |

FOREIGN PATENT DOCUMENTS 831615  3/1960  United Kingdom .................. 428/12

Primary Examiner—Henry F. Epstein
Attorney, Agent, or Firm—Thompson, Birch, Gauthier & Samuels

[57] ABSTRACT

A yieldable type ornament assembly has an ornament body member which includes a base section fixedly attached to a section of a vehicle body by fastening means and an ornamented section projecting from said base section outwardly of the vehicle body. The ornamented section is made of an elastic material so as to be elastically deformable when subjected to a force exceeding a predetermined value and restorable to its initial shape when said force disappears.

12 Claims, 11 Drawing Figures

(PRIOR ART)

YIELDABLE TYPE ORNAMENT ASSEMBLY

BACKGROUND OF THE INVENTION

The present invention relates to a tiltable or yieldable type ornament assembly which is mounted on a section of a vehicle body such as a hood panel or a trunk lid panel for yielding movement so as to prevent injury thereby as well as damage thereto.

A typical prior art construction of the above-mentioned type ornament assembly is illustrated in FIGS. 1 and 2 and will be described hereinbelow.

In FIGS. 1 and 2, a yieldable type ornament assembly generally designated by the reference numeral 70, is composed of the following component parts:

(i) an ornament body member 71 formed as a die casting;

(ii) ornamental strips 72, 73 made of acrylic resin and bonded to the front and rear sides of the ornament body member 71, respectively, by means of double-faced adhesive tape;

(iii) an inverted U-shaped pin 75 inserted into an opening 74 formed in the lower part of the ornament body member 71 and depending downwardly therefrom;

(iv) a base member 78 normally holding said ornament body member 71 in its upright position;

(v) a spacer 77 made of a relatively soft plastic and interposed between the base member 78 and a section of a vehicle body such as a hood panel 76;

(vi) a fastening plinth 80 partially surrounding the downwardly depending section 79 of the base member 78 and forcibly pressed against the inner surface of the hood panel 76;

(vii) a nut 82 screwed onto the depending section 79 of the base member 78 at the threaded part 81 thereof and cooperating with the fastening plinth 80 to fixedly attach the base member 78 to the hood panel 76;

(viii) a coiled spring 85 in a compressed condition, wound about the pin 75 and having its upper end seated against a horizontal pin 83 and its lower end 84 seated on a bent lower end of the pin 75; and (ix) a cap nut 86 screwed onto the depending section 79 of the base member 78 at the threaed part 81 thereof to prevent acess of mud and water.

If the above-mentioned ornament assembly 70 should be contacted by a person or by some object, the ornament body member 71 tilts or yieldingly moves relative to the base member 78, preventing injury thereby as well as damage thereto.

The ornament assembly of the described type, however, requires a number of component parts, that is, nine parts, thus resulting in a relatively large manufacturing and assembling expense. Moreover, the ornament assembly has the disadvantage that it is inclined to chatter or rattle in response to vibrations of the vehicle body particularly when the spring 84 begins to weaken.

The present invention aims to obviate the foregoing drawbacks inherent in the prior art yieldable type ornament assembly.

It is an object of the present invention to provide a novel and improved yieldable type ornament assembly for automotive vehicles, which is composed of a reduced number of component parts thereby reducing manufacturing and assembling expense.

It is another object of the present invention to provide a novel and improved yieldable type ornament assembly of the above-mentioned character which will not rattle or chatter, even after extended periods of use.

BRIEF DESCRIPTION OF THE DRAWINGS

These and other objects and advantages of a yieldable type ornament assembly for automotive vehicles according to the present invention will become more clearly understood from the following description taken in conjunction with the accompanying drawings in which.

DESCRIPTION OF THE PREFERRED EMBODIMENTS

Figure 1:
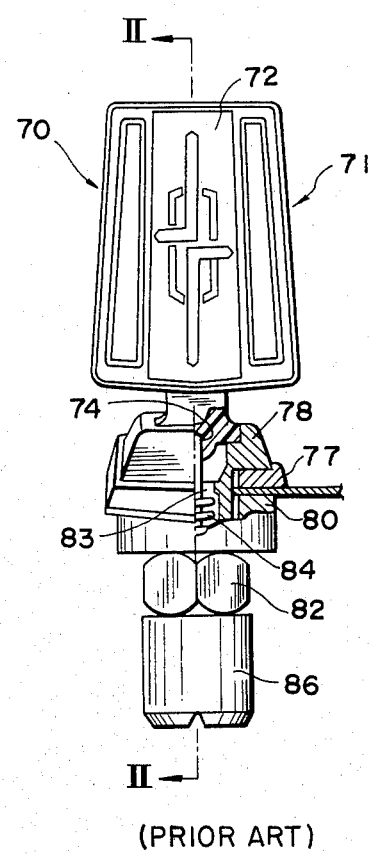
FIG. 1 is an elevational view partly in section showing a prior art yieldable type ornament assembly.
Figure 2:
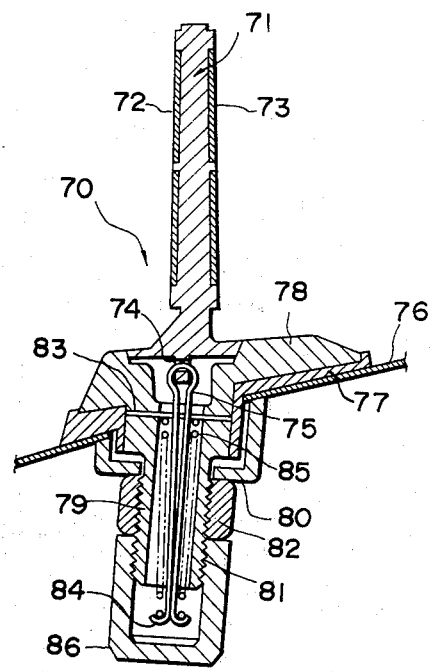
FIG. 2 is a sectional view taken approximately along line II—II of FIG. 1.

Several embodiments according to the present invention will be described hereinbelow with reference to FIGS. 3 to 11 in which like reference numerals designate like parts throughout the several views thereof.

Figure 3:
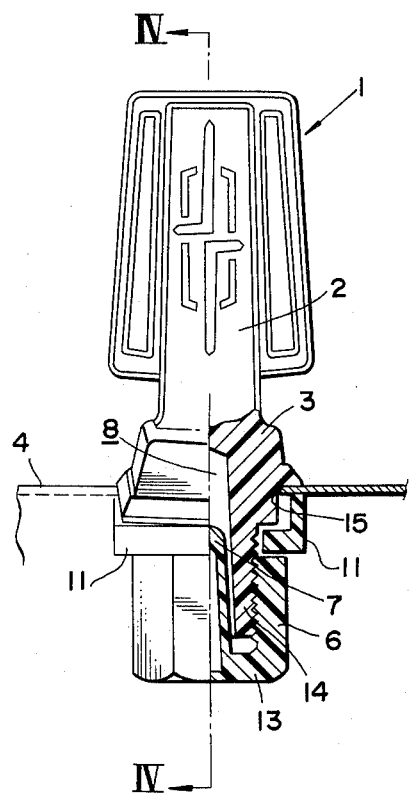
FIG. 3 is an elevational view partly in section showing a yieldable type ornament assembly according to the present invention.
Figure 4:
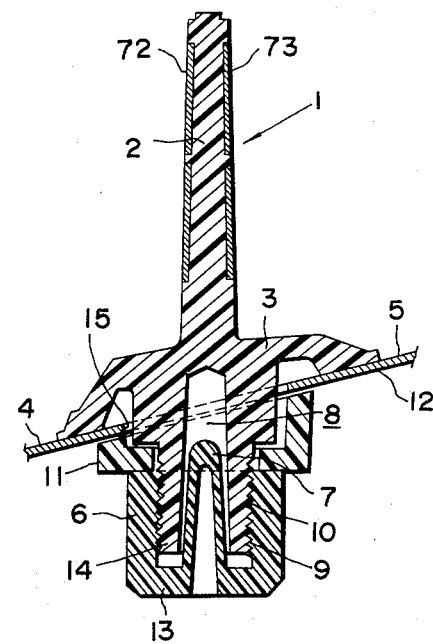
FIG. 4 is a cross sectional view taken approximately along line IV—IV of FIG. 3.

Referring first to FIGS. 3 and 4, a yieldable type ornament assembly according to the present invention is provided with an ornament body member generally designated by the reference numeral 1. The ornament body member 1 comprises a base section 3 placed on a section of a vehicle body such as a trunk lid panel or a hood panel 4 and an ornamented section 2 which projects from the base section 3 outwardly of the vehicle body. As seen from the drawings, the ornamented section 2 and the base section are integrally formed and preferably out of the same material. The ornament body member 1 is moulded out of a synthetic resin preferably of a Shore hardness ranging from 35 to 80 or more preferably of a Shore hardness ranging from 40 to 70 such as polyester resin or ABS resin.

The base section 3 is mounted on the outer surface 5 of the hood panel 4 and integrally formed with a downwardly depending part or leg 14 which is inserted into an opening 15 formed in the hood panel 4. The leg 14 is hollow at 8 and has a threaded exterior section 9 onto which a cap nut 6 having a threaded section 10 is screwed. The cap nut 6, the leg 14 with the threaded exterior section 9 and a fastening plinth 11 constitutes fastening means for fixedly attaching the base section 3 to the hood panel 4. As best shown in FIG. 4, the cap nut 6 has at the lower end wall 13 thereof a central projection 7 which is received within said leg 14. The fastening plinth 11 is in the form of a square cross section sleeve having at one end thereof an inwardly extending flange and interposed between the inner surface 12 of the hood panel 4 and the cap nut 6 to be clamped therebetween.

Figure 5:
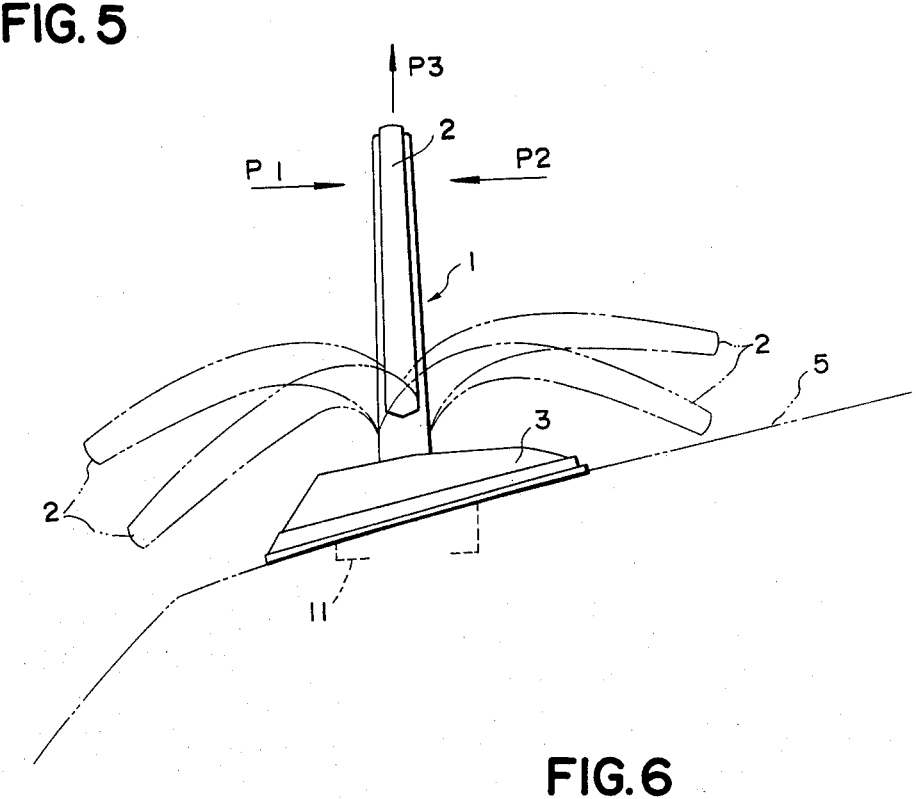
FIG. 5 is a side elevational view of the ornament assembly of FIG. 3, with phantom line showings of the ornamented section indicating variously bent conditions of same.
Figure 6:
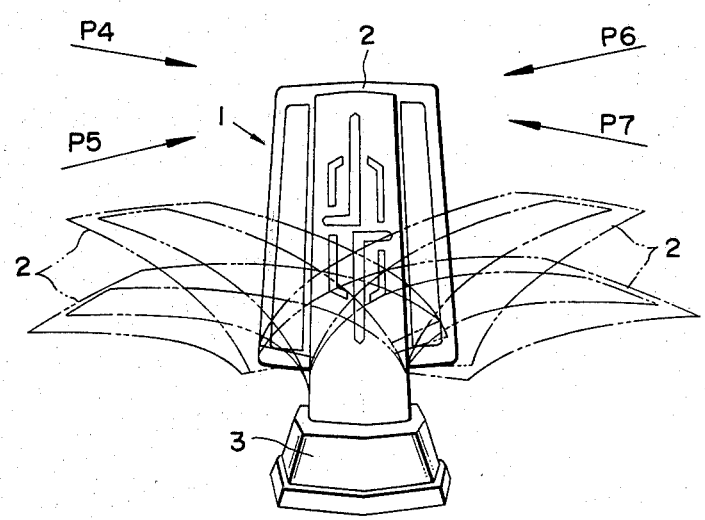
FIG. 6 is an elevational view of the ornament assembly of FIG. 3, with phantom line showings of the ornamented section indicating variously bent conditions of same.

In the yieldable type ornament assembly according to the present invention, thus described the ornamented section 2 is elastically deformable variously as shown by phantom lines in FIGS. 5 and 6. That is, if the ornamented section 2 should be contacted by a person or by some object and receive a force in the direction of the arrows $P_1$ or $P_2$ shown in FIG. 5, it is elastically deformed as shown by the phantom lines in the drawing, preventing injury thereby as well as damage thereto. Furthermore, if the ornamented section 2 should receive a force in the direction of arrow $P_3$ in FIG. 5, the leg 14 will be subjected to a force that tends to bend the wall of the leg 14 longitudinally and inwardly. In this instance, the central projection 7 of the cap nut 13 prevents such bending of the wall of the leg 14 thus preventing the ornament body member 1 from being pulled out by such force $P_3$ thus providing an assured mounting of the ornament body member 1 on the hood panel 4. In addition to receiving the central projection 7, the leg 14 is made hollow for the additional reason of preventing surface deffects from being formed on the outer surface of the base section 2 upon moulding of the ornament body member 1.

If the ornamented section 2 receives a force applied thereto in the direction of arrows $P_4$, $P_5$, $P_6$ or $P_7$ shown in FIG. 6, it is correspondingly deformed as shown by the phantom lines in the drawing, preventing injury thereby as well as damage thereto.

However, the ornamented section 2 has sufficient hardness so as not to be deformed by air resistance acting thereagainst during running of the vehicle.

Figure 7:
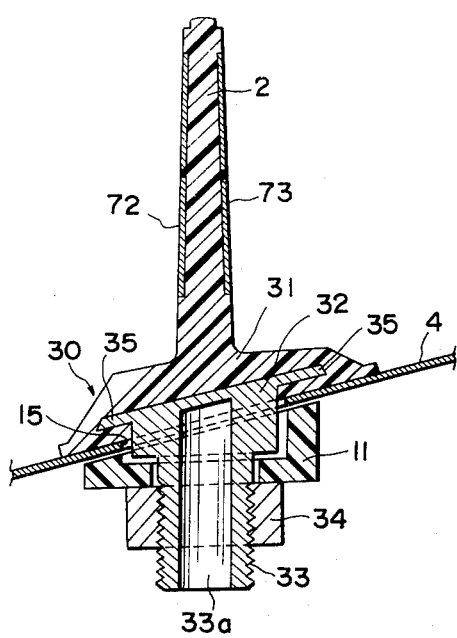
FIGS. 7 to 10 are cross sectional views showing further embodiments according to the present invention, respectively.

Referring to FIG. 7, another embodiment according to this invention will be described.

In this second embodiment, there is provided an ornament body member 30 which comprises an ornamented section 2 and a base section 31 integral with said ornamented section similar to the first embodiment of FIGS. 3 and 4. The base section 31 is provided with a separately formed leg 32 which is made of a material harder than the base section, for example, of a die casting as of aluminum or a hard, tough plastics such as ABS resin or polyacetal resin. The leg has a flange portion 35 which is embeded in said base section 31 and securely attached to the confines of the base section by adhesive. As seen from the drawing, the leg 32, being inserted into an opening 15 of the hood panel 4, is hollow at 33a and has a threaded exterior section 33 onto which a nut 34 is screwed. The nut 34, the leg 32 with the threaded exterior section 33 and the fastening plinth 11 constitutes fastening means for fixedly attaching the base section 31 to the hood panel 4.

In the second embodiment thus described, since the leg 32 made of a relatively hard, tough material can cooperate with the nut 34 to provide a relatively large clamping force and furthermore the flange portion 35 of the leg 32 is securely attached to the confines of the base section 31 by adhesive, more assured attachment of the base section 31 onto the hood panel 4 results. Moreover, since the leg 32 is made of a relatively hard, tough material, the nut 34 can be of a standard article on the market.

Figure 8:
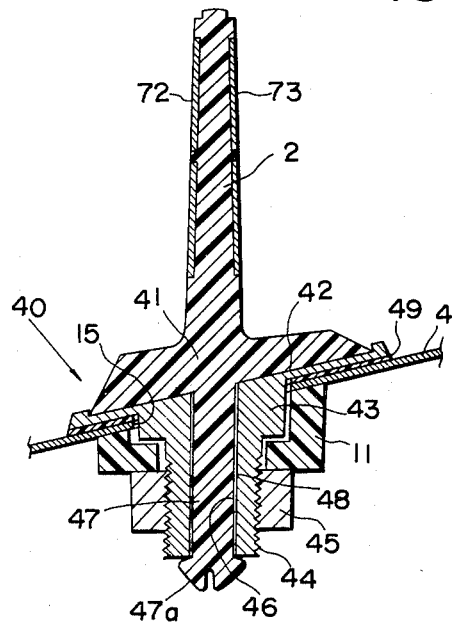

Referring to FIG. 8, a further embodiment according to this invention will be described.

In this third embodiment, an ornament body member 40 comprises an ornamented section 2 and a base section 41 integral with the ornamented section similarly to the first and second embodiments. The base section 41 is provided with a separately formed leg 43 which is made of a material harder than the base section in a manner similar to the second embodiment and which includes a flange portion interposed between the base section 41 and the hood panel 4. The flange portion of the leg 43 is securely attached at the upper surface thereof to the base section 41 by adhesive 42. Between the flange portion of the leg 43 and the hood panel 4 there is interposed a spacer 49 which is made of a resilient material. The leg 43 is inserted into the opening 15 of the hood panel 4 and has an axial bore 46 passing therethrough. The base section 41 has an integral anchor projection 47 depending downwardly therefrom. The anchor projection 47 is inserted into the bore 46 and has an expanded free end 47a protruding from the bore 46, which cooperates with the lower end of the leg 43 to hold the base section 41 and the leg 43 together. The anchor projection 47 is securely attached to the wall of the leg 43 defining the bore 46 by adhesive 48. Similarly to the second embodiment of FIG. 7, the leg 43 also has a threaded exterior section 44 onto which a nut 45 is screwed. The nut 45, the fastening plinth 11, the leg 43 with the threaded exterior section 44, the anchor section 47 and adhesive 42, 48 constitute fastening means for fixed attaching the base section 41 to the hood panel 4.

This third embodiment can produce substantially the same effect as the second embodiment. In addition to such effect, the ornament body member 40 can be attached to the leg 43 after the attachment of the leg 43 to the hood panel 4, resulting in an easy and simple assemblage thereof.

Figure 9:
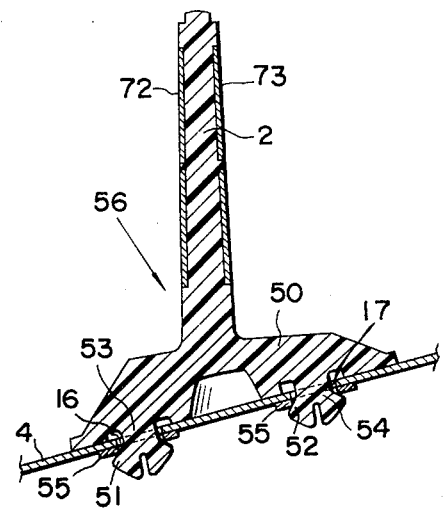

Referring to FIG. 9, a yet further embodiment according to the present invention will be described.

In this fourth embodiment, an ornament body member 56 comprises an ornamented section 2 and a base section 50 integral with the ornamented section in an arrangement similar to the previous embodiments. The base section 50 has integral legs 53, 54 which are inserted into the openings 16, 17 of the hood panel 4, respectively. The legs 53, 54 are arranged to be spaced from each other in the front-and-rear direction of the vehicle body. The legs are provided with expanded free ends 51, 52 having slots so as to be elastically contractable upon insertion into the openings 16, 17, respectively. In order to prevent pulling out or slipping off of the legs and therefore the ornament body member, there is provided a C-shaped ring or split ring 55 which engages each of the neck portions of the legs.

In this fourth embodiment, the legs 53, 54 and the split rings 55 constitute fastening means for fixedly attaching the base section 50 to the hood panel 4.

Figure 10:
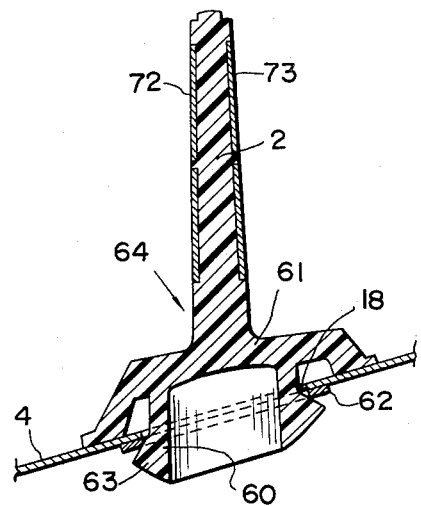

Referring to FIG. 10, a yet further embodiment according to the present invention will be described.

Figure 11:
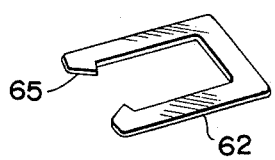
FIG. 11 is a perspective view of a split ring incorporated in the ornament assembly of FIG. 10.

In this fifth embodiment, there is provided an ornament body member 64 which is substantially similar to the ornament 56 of the fourth embodiment except for the structure relating to a leg 60. The leg 60 is integrally formed with a base section 61 and out of the same material as the ornamented section 2. The leg 60 is inserted into an opening 18 of the hood panel 4 and has an expanded free end 63 located inside of the hood panel 4. Further, the leg 60 is in the form of a non-circular ring shaped cross section having a longer axis extending in the front-and-rear direction of the vehicle. In order to prevent detachment of the leg 60 from the hood panel 4, there is provided a U-shaped or channel-shaped split ring 62 as best shown in FIG. 11, which engages the neck section of the leg 60. The split ring 62 is provided with fingers 56 at the free ends thereof, respectively for its assured mounting.

In this fifth embodiment, the leg 60 and the split ring 62 constitutes fastening means for fixedly attaching the base section 61 to the hood panel 4.

By the foregoing, there has been provided a novel and improved yieldable type ornament assembly for automotive vehicles calculated to fulfil the objects hereinabove set forth and while preferred embodiments have been illustrated and described in detail hereinabove, various additions, substitutions, modifications and omissions may be made thereto without departing from the spirit of the invention as encompassed by the appended claims.

What is claimed is:

1. A yieldable type ornament assembly for mounting on a vehicle body comprising:
   an ornament body member having a base section adapted to be fixed relative to a section of the vehicle body and an ornamented section projecting from said base section outwardly of the vehicle body; and
   fastening means for fixing said base section relative to the vehicle body section, said fastening means including at least one element integrally associated with said base section and protruding downwardly through an opening in said vehicle body,
   said ornamented section being formed with said base section as a single integral piece of elastic material and being elastically deformable when subjected to a force exceeding a predetermined value and restorable to its initial shape when said force disappears.

2. A yieldable type ornament assembly as claimed in claim 1 in which said element comprises a leg integrally formed with said base section and out of the same material as the latter.

3. A yieldable type ornament assembly as claimed in claim 1 in which said element comprises a hollow leg with a threaded exterior section, and in which said fastening means further includes a cap nut which is screwed onto said leg and which has a central projection received within said leg section.

4. A yieldable type ornament assembly as claimed in claim 3, in which said leg is separately formed from said base section and of a material harder than the latter.

5. A yieldable type ornament assembly as claimed in claim 1 in which said element comprises a leg with a flange portion embedded in said base section and securely attached to the confines of said base section by adhesive, said leg has a threaded exterior section, and in which said fastening means further includes a nut screwed onto said leg to fixedly attach said base section to said vehicle body section.

6. A yieldable type ornament assembly as claimed in claim 1 in which said element comprises a leg with an axial bore passing therethrough and a flange portion interposed between said base section and said vehicle body, said leg has a threaded exterior section, said base section has an integral anchor projection which is inserted into said bore and which has an expanded free end protruding from said bore, and in which said fastening means further includes a nut screwed onto said leg to fixedly attach said base section to said vehicle body section.

7. A yieldable type ornament assembly as claimed in claim 6, in which said leg is securely attached at said flange portion and said bore thereof to said base section and said anchor projection by adhesive.

8. A yieldable type ornament assembly as claimed in claim 2, in which said leg has an expanded free end and in which said fastening means further includes a split ring which is fitted to said leg to cooperate with said expanded end thereof to fixedly attach said base section to said vehicle body section.

9. A yieldable type ornament assembly as claimed in claim 1, in which said vehicle body section comprises a hood panel.

10. A yieldable type ornament assembly as claimed in claim 1, in which said vehicle body section comprises a trunk lid panel.

11. A yieldable type ornament assembly for mounting on a vehicle body comprising:
    a one-piece ornament body member having a base section placed on a section of the vehicle body and an ornamented section projecting from said base section outwardly of the vehicle body; and
    fastening means for fixedly attaching said base section to the vehicle body section, said fastening means including at least one element integrally associated with said base section and protruding downwardly through and interiorly of the vehicle body section, said ornament body member being made of an elastic material such that said ornamented section is elastically deformable when subjected to a force exceeding a predetermined value and restorable to its initial shape when said force disappears.

12. A yieldable type ornament assembly for mounting on a vehicle body comprising:
    a one-piece ornament body member having a base section placed on and exteriorly of a section of the vehicle body and an ornamented section projecting from said base section outwardly of the vehicle body; and
    fastening means for fixedly attaching said base section to the vehicle body section, said fastening means including at least one element integrally associated with said base section and protruding downwardly through and interiorly of the vehicle body section, said ornament body member being made of a synthetic resin of a Shore hardness ranging from 40 to 70 and adapted to allow the ornamented section to be elastically deformed when subjected to a force exceeding a predetermined value and to be restored to its initial shape when said force disappears.

* * * * *